Fig. 2

INVENTOR:
HOWARD POLLOCK YOUNG,
BY
ATTORNEYS.

Fig. 6.

June 24, 1930.  H. P. YOUNG  1,767,499
LEATHER MEASURING MACHINE
Filed Nov. 14, 1927  8 Sheets-Sheet 7

INVENTOR:
HOWARD POLLOCK YOUNG,
BY
ATTORNEYS.

June 24, 1930.  H. P. YOUNG  1,767,499
LEATHER MEASURING MACHINE
Filed Nov. 14, 1927  8 Sheets-Sheet 8

INVENTOR:
HOWARD POLLOCK YOUNG,
BY
ATTORNEYS.

Patented June 24, 1930

1,767,499

UNITED STATES PATENT OFFICE

HOWARD POLLOCK YOUNG, OF WILMINGTON, DELAWARE, ASSIGNOR TO F. F. SLO-COMB & CO., INC., OF WILMINGTON, DELAWARE, A CORPORATION OF DELAWARE

LEATHER-MEASURING MACHINE

Application filed November 14, 1927. Serial No. 232,957.

My invention relates to a new and useful leather, hide or skin measuring machine, and relates more particularly to a machine not only for measuring the size or area as well as the thickness or heft of a skin or the like, and indicating such measurements of size or area and thickness or heft upon suitable dials, but also for automatically stamping upon each hide or skin, these two measurements, thereby to produce a permanent, visible marking upon each skin, of the size and heft of a skin, if so desired.

From the earliest times, skins have been sold according to size and thickness and for many generations, the appraisal of the thickness of a skin was left to the judgment and manual touch of men experienced in the handling of skins, usually known as hefters, who would then check or mark each skin with the thickness, as estimated merely by visual inspection and touch.

Machines have been built for measuring the area or size of the skins and also for measuring the thickness or heft of the skins. These machines of the prior art have been inadequate in many respects, partly due to their inaccuracy and partly due to the fact that they merely indicated the measurements rather than permanently marking or stamping the same upon the skins in an automatic manner, thereby still requiring the intervention of the human element in reading the dimensions and manually marking the same upon the skins.

The object of my invention is therefore:

1. Accurately to measure the area of a skin passing through the machine by a mechanical process of integration;

2. To measure the thickness of the skin at two or more points and to indicate the average thickness at these two or more points;

3. Automatically to locate upon the skin the two or more points from which the measurements of thickness are taken, so as to approximate those parts of a skin which are usually considered by hefters as representative of the average thickness or quality of the particular skin;

4. Automatically visually to indicate upon suitable dials the area and thickness measurements;

5. Automatically to transfer each of said two measurements to corresponding printing devices and to print or stamp such measurements upon the skin the instant the skin has passed completely through the measuring devices.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings in which like reference characters indicate like parts

The frame of the machine comprises the two side frame members 26 and 27, which in turn support a series of longitudinal frame or transverse members. Between the two side frame members 26 and 27 (Figures 1 and 3), the table 28 is supported substantially horizontally and with its upper or working surface in tangential alignment with the top of the main driving or bed roll 29. The latter is carried by the main horizontal longitudinal shaft 30, which is suitably journalled in the two side frame members 26 and 27, and to one end of which the fixed and loose pulleys 31 and 32 respectively, are attached. A suitable driving belt (not shown in the drawing) connects either the fixed or loose pulleys 31 or 32, with a source of motive power, such as an electric motor or the like.

A front longitudinal frame member 33 is supported at its two ends by means of the two side or main frame members 26 and 27. The frame member 33 carries a series of suitably spaced pivot brackets 34, spaced at close intervals throughout its entire length, to each one of which a bearing arm or lever 35 is pivotally secured, by means of the pivot bolts 36.

Each lever 35 carries a measuring wheel 37 and pinion 38, mounted about midway of the length of the lever and free to rotate thereon, said pinion 38 being fixedly connected with the measuring wheel 37. The free end of the measuring wheel lever 35 supports the connecting rod 39, with which it is connected by means of a pivot pin or bolt 40.

The upper transverse frame member 41, also supported between the two main or side frame members 26 and 27, carries a longitudinal pivot rod 42, suitably supported by the brackets 43, upon which are supported a series of balance arms 44, corresponding to the series of measuring wheels 37. Each of the balance arms 44 is provided with a fulcrum bearing 45 intermediate of its two ends. The fore end of the balance arms is bifurcated and provided with a pair of journals 46, which support corresponding trunnions 47 of a gear sector 48, thereby pivotally supporting said sector upon one end of the balance arm 44. The opposed or rear end of the balance arm 44 carries a counterweight 49, which in part counterbalances the weight of the pivotally supported gear sector 48 on the other end of the balance arm. The final balance of the arm 44, however, is completed through the connecting rod 39, which passes through the end of the arm 44 at a suitable distance from the fulcrum bearing 45, as will be seen from Figure 3, and is adjustably anchored thereto by means of the wing nut 50, threaded onto the end 51 of the connecting rod 39.

By this means the weight of the gear sector 48 is counterbalanced in part by the counterweight 49 and in part by the weight of the arm 35 and measuring wheel 37 carried by said arm, and through the connecting rod 39.

In the normal or inoperative position of the machine, the sectors 48 are spaced from the pinions 38 at a distance somewhat less than the thickness of the leather to be measured. Thus, as the skin 52 is passed between the bed roll 29, revolving in the direction of the arrow 53 and the series of wheels 37, the skin raises said measuring wheels 37 as well as the corresponding supporting arms or levers 35 and the corresponding connecting rods 39 a distance corresponding to the thickness of the skin. The raising of the connecting rods 39 releases the corresponding balance arms 44 and lowers the fore ends thereof, thereby lowering the corresponding gear sectors 48 into mesh with the corresponding pinions 38, positioned below and in alignment with the same, though normally out of engagement therewith.

The skin 52 raises the measuring wheels 37, and thus effects an operative engagement between the pinions 38 carried by said measuring wheels and a corresponding gear sector 48, causing said sectors to move an amount corresponding to the linear distance travelled over the surface of the skin by each particular measuring wheel. The linear distances thus travelled by the peripheries of the measuring wheels 37, over parallel lines on the skin, is transmitted through the pinions 38 to the corresponding gear sectors 48, each of which latter are therefore deflected an amount proportionate to linear measurements of the skin along corresponding and equidistant parallel lines.

Each sector 48 is provided with a sheave portion 55, to which one end of a chain 56 is secured. The chain from each sector 48 passes upwardly in a substantially vertical line and over a corresponding pendant sheave 57 and then back onto the sheave portion 55 of the next adjacent sector 48. By this means, each pair of adjacent sectors 48 is connected by means of a measuring chain 56. The sheaves 57 are in turn carried in groups of suitable number, upon a series of secondary balance beams 58, which in turn are carried by other balance beams 59 and 60, the latter of which is connected by means of the chain 61, to a suitable point along the main balance beam 62. The end of the chain 61 is preferably fastened to an adjustable support or anchor 63 in the form of a threaded rod, passing through the bracket 64, and adjustably secured by means of the lock nut 65. The main balance beam 62 is fulcrumed at 66 and is provided with a counterweight 67 adjustably secured thereto by means of the set screw 68, whereby the weight of the entire compound balance beam 58, 59 and 60, and the weight of the sheaves 57 and the chains 56 may be suitably counterbalanced.

Upon the upper longitudinal frame member 41, a journal bracket 69 is secured, in which a horizontal indicator shaft 70 is suitably journalled. The pinion 71 is fixedly secured to the fore end of the shaft 70, and is in mesh with a gear sector 72 carried by one end of the main balance beam 62. By this means, the deflection of the main balance beam 62 is transmitted to the indicator shaft 70. The fore end of the indicator shaft 70 also carries a pointer 73, which travels over a suitably graduated, area indicator dial plate 74, having divisions thereon corresponding to the integrated area measurement transmitted from the measuring wheels 37, through the sectors 48 and the compound balance beams 58, 59 and 60, and through the main balance beam 62, and through the pinion 71 and sector 72.

The rear end of the indicator shaft 70 carries a pinion 75 which is in mesh with the rack 76, slidably mounted in the vertical side 77. The lower end of the rack 76 is connected with one end of a rocker arm 78, pivoted at 79 upon the bracket 80. For the purposes of adjustment between the rack 76 and the rocker arm 78, the connecting rod 81 intermediate said rack 76 and the arm 78 is threaded at both ends into corresponding bifurcated turn knuckles 82 and 83, which in turn are pivotally connected with the rack 76 and the arm 78, respectively. The opposed end of the arm 78 is in turn connected with a rack 84 slidably mounted in the vertical guide 85, through a similar adjustable threaded connecting rod 86 and turn knuckles 87 and 88 respectively. The lower rack 84 is in mesh with a pinion 89 carried by a printing shaft 90, which is carried by the two brackets 91 and 92, respectively. The pinion 89 carries an area printing or type wheel 93, having a cylindrical periphery, upon which are embossed suitable raised numerals and corresponding graduations, corresponding to the dial graduations and numerals of the dial plate 74.

By the co-action of printing ribbon and striking mechanism, to be described hereinafter, the printing wheel 93 produces a permanent visible marking upon the skin or leather after it has passed from under the measuring wheels, which is indicative of the aggregate area of said skin, leather or other sheet material.

*Thickness measurement or "heft"*

The measurement of the thickness, or "hefting," depends upon the vertical displacement or "lift" of the measuring wheel 37, by the body of the skin, while it is positioned between said measuring wheel and the bed roll 29.

While it is possible to average the thickness beneath each of the measuring wheels 37, with which the skin is in contact, yet for certain practical reasons the "lift" of merely two measuring wheels 37 is averaged. Two measuring wheels, suitably spaced from each other are selected so as particularly to cover the two portions of a skin, which are usually considered by hefters as representative of the thickness or "heft" of the skin. The selection of the two particular measuring wheels 37 for the thickness measurement depends somewhat on the character of the skin to be measured.

The measuring wheel supporting levers 35, carrying each of these two measuring wheels 37, are extended rearwardly beyond the pivot pin 40, which connects said lever with the rod 39. To the rearmost or free ends 96 and 97 of these two levers 35, a transverse equalizer rod 95 is loosely secured, and the thickness measurement is then taken from the center of this transverse equalizer rod 95, so as to secure the average lift of the two particular measuring wheels 37.

Since a skin usually varies in thickness very considerably, even beneath each individual measuring wheel, it is also necessary to refer the thickness measurement of "heft" to a certain part of the skin as it passes beneath the measuring wheels.

A reference wheel 98 is accordingly provided, having a uniform circular periphery 99 throughout the major portion of its circumference, the linear distance of which is equal to the distance of the hefting spot of the skin from the entering edge of the skin. The uniform circular periphery 99 is interrupted by an offset peripheral portion 100 of a substantially smaller diameter than the measuring periphery 99. The reference wheel 98, carries a pinion 101, and is rotatably mounted upon a supporting arm 102.

The supporting arm 102 is pivotally supported at its front end 103, upon the stationary bracket 104, while the rear or free end of said supporting lever 102 rests upon an adjustment screw 105, carried by the stationary bracket 106, wherein it may be locked in any desired adjusted position, by means of the lock nut 107.

A heft reference cam bar 108 is provided intermediate the reference wheel 98 and the heft left equalizer bar 95. The front rack portion 109 of the reference bar 108 rests upon and is in mesh with the pinion 101 carried by the reference wheel 98. In order to maintain the rack 109 in mesh with the pinion 101, the guide roll 110 is rotatably mounted upon the pin 111, upon the supporting lever 102, directly above the upper edge of the rack 109, thereby to guide said rack 109 substantially horizontally and in mesh with the pinion 101.

The rear cam end 112 of the reference cam bar 108 rests upon the center of the heft lift equalizer bar 95, and is provided with a high reference point 113, a low clearance portion 114, a gradually rising cam surface 115 intermediate the low clearance portion 114 and the high heft reference point 113 and is also provided with a low clearance portion 116 immediately following the high heft reference point 113. To the rear cam portion 112 of the reference bar 108, an auxiliary locking bar 117 is secured, substantially parallel to the body of the bar 108, by means of the rivets 118.

In the normal inoperative position of the machine, a slight clearance is maintained at 119, between the bed roll 29 and the reference wheel 98, which is immediately above and in vertical axial alignment therewith. Thus, so long as the machine is running idle, that is, without any skin, the reference wheel 98 will not be engaged by the bed roll 29 revolving in the direction of the arrow 53. This clearance is controlled and maintained by means of the adjustment screw 105 and must be maintained somewhat less than the thickness of the leather to be measured, in order that the skin passing between the bed roll 29 and the reference wheel 98 may effect an operative engagement between the two.

A follower slide 120, slidably mounted in the vertical guide 121, above and in vertical alignment with the cam portion 112 of the heft reference bar 108, is provided at its lower end with a follower roller 122, which is adapted to be engaged by the series of surfaces 113 and 115 of said cam portion 112. Bar 112 passes through a suitable aperture 123 in the bracket wall 124, which supports the vertical guide 121. The aperture 123 retains the bar 112 against any lateral movement while permitting a slight vertical movement thereof as required by the lift of the equalizer bar 95.

To the upper bifurcated end 125 of the vertical follower slide 120, a lever 126 is pivotally secured by means of the pivot bolt 127. One end of the lever 126 is fixed by the stationary pivot 128, carried by the stationary bracket 129, while the free end 130 of said lever 126 is provided with an adjustment slot 131, to which the turn knuckle 132 may be adjustably secured, by means of the pivot bolt 133.

A lever 134 mounted upon the stationary pivot 135, upon the stationary bracket 136 is provided with a similar adjustment slot 137, whereby the turn knuckle 138 may be adjustably secured to the lever 134. A threaded connecting rod 139 is interposed between the two turn knuckles 132 and 138, in a manner shown particularly in Figure 2, which may be locked in any adjusted position relative thereto, by means of the lock nuts 140 and 141.

One end of the lever 134 carries a counter-weight 142, upon a suitable arm 143, by the adjustment of which the dead weight of the heft measuring and indicating lever system may be suitably counterbalanced.

To the free end 144 of the lever 134, a pair of opposed sets of links 145 and 146 are secured, by means of the common pivot pin 147. The upper set of links 145 is pivotally secured to the heft indicator arm 148, pivotally mounted at 149, and the free end of which passes over a suitably graduated heft indicator dial 151.

The heft indicator dial 151 may be suitably graduated and provided with any suitable indicia indicative of the thickness of the skin. Thus in the particular illustration in Figure 2, the letters L and M upon the heft dial 151 indicate light and medium, respectively. While in the particular illustration shown, the heft is merely indicated by such letters as L and M, it is equally feasible to graduate the dial in terms of actual thickness measurements expressed in fractions of an inch or the like.

Figures 7, 8, 9, 10, 11:
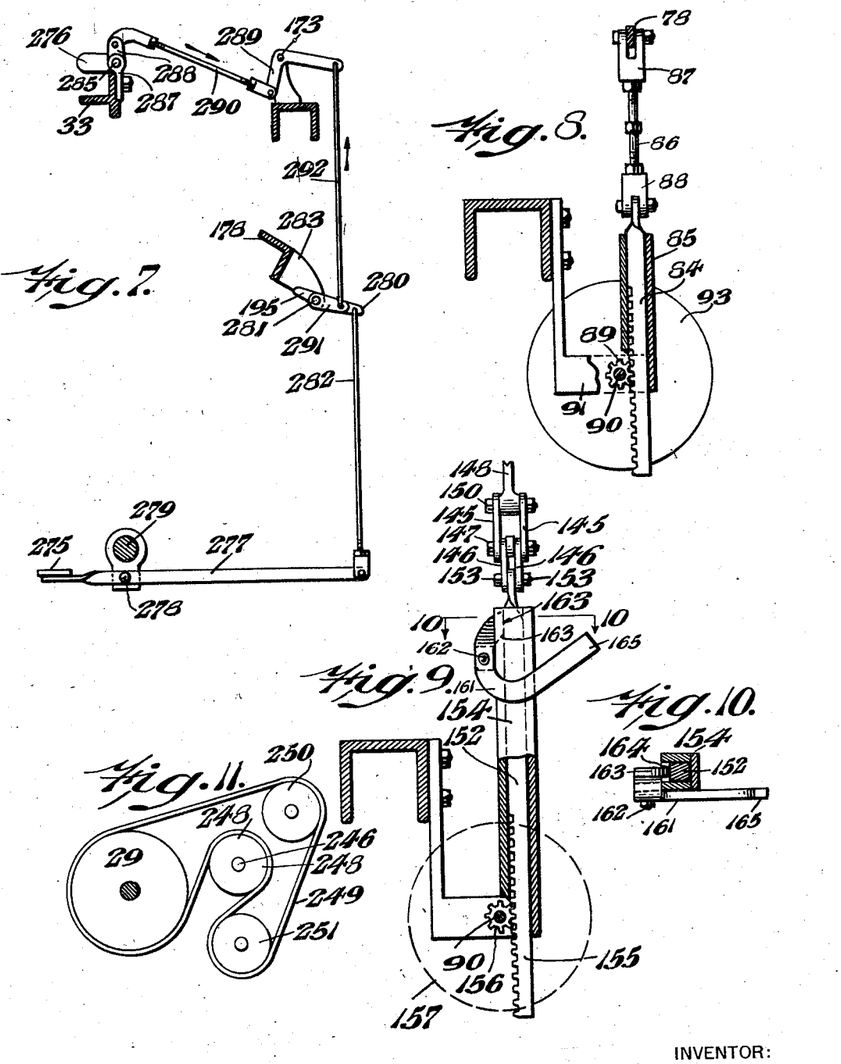
Fig. 7 represents a side elevation of a sub-assembly, on a reduced scale, of the mechanism for restoring the machine into its original position after each skin or each separate measurement.
Fig. 8 represents a section on line 8—8 of Figure 2, illustrating also a sub-assembly of the connection between the area measuring and indicating device and the area printing roll.
Fig. 9 represents a section on line 9—9 of Figure 2, illustrating the sub-assembly of the connection between the thickness measuring and indicating mechanism and the thickness printing roll.
Fig. 10 represents a section on line 10—10 of Figure 9, showing the friction brake applied to the thickness measuring device.
Fig. 11 represents a section on line 11—11 of Figure 2, showing the driving connection between the main or bed roll and the auxiliary driving roll of the machine, for drawing the skins out of the machine and through the printing device.

The lower set of links 146 is connected with a vertical heft printing rack bar 152, by means of the pivot pin 153; said rack bar 152 being slidably mounted in the guide 154, (shown particularly in Figures 9 and 10.) The lower rack portion 155 of the bar 152, is in mesh with a pinion 156 which carries the heft printing wheel 157 and which is rotatably mounted therewith, upon the printing shaft 90.

Figures 4, 5:
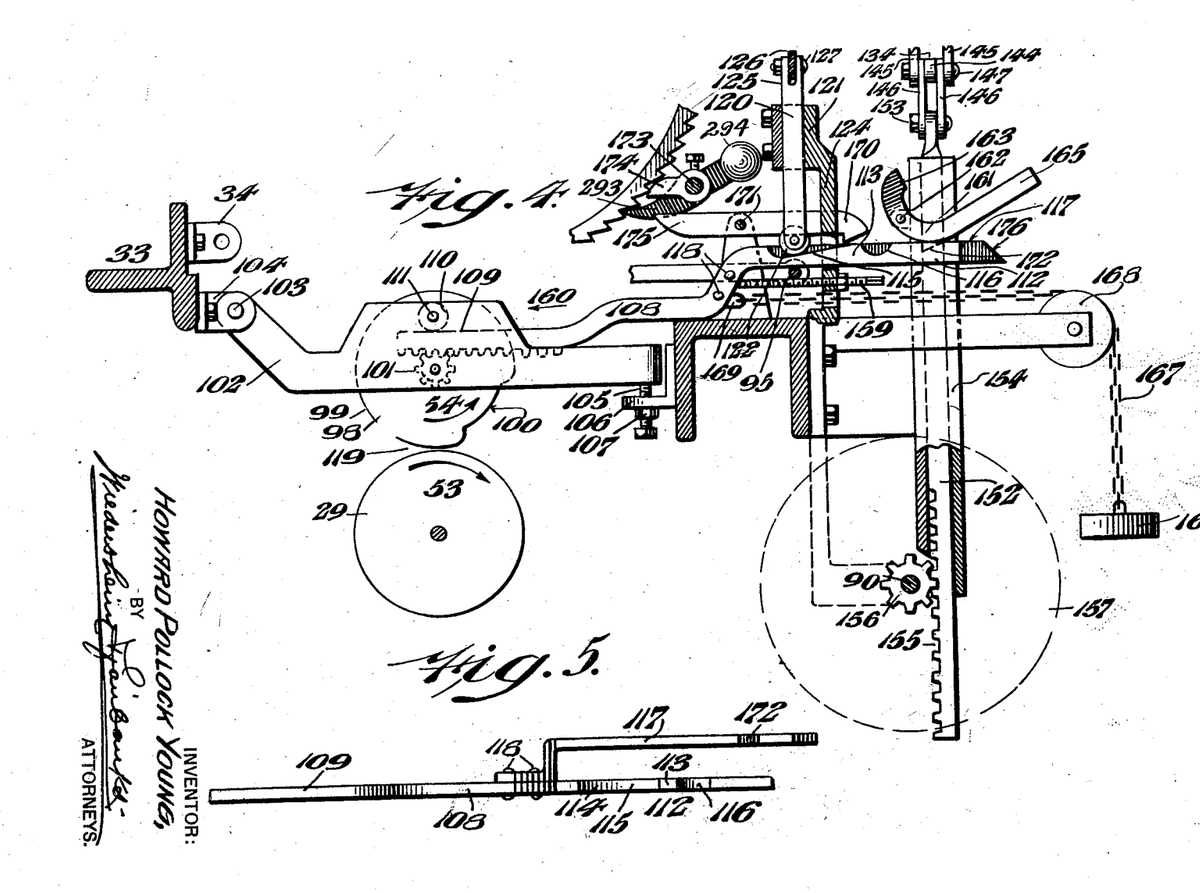
Fig. 4 represents a section on line 4—4 of Figure 2, similar to the section shown in Figure 3, on a somewhat enlarged scale, however, and illustrating a sub-assembly of the thickness measuring devices.
Fig. 5 represents a top plan view of the thickness measuring, timing bar.

In the inoperative position of the machine, the heft reference wheel 98 is in a position shown in Figure 4, with the bar 108 in the rearmost position. This initial or starting position of the bar 108, as well as of the reference wheel 98 is determined by the set screw 159, the end of which bears against the bar 108.

Upon feeding a skin or other sheet material onto the bed roll 29, engagement is effected between the revolving bed roll, and the theretofore stationary reference wheel 98, as well as the measuring wheels 37. The reference wheel 98 is therefore revolved in the direction of the arrow 54, thereby causing the bar 108 to be moved forwardly in the direction of the arrow 160.

During the entire movement of the bar 108, the equalizer rod 95, carried by the lever extensions 96 and 97, is raised to various degrees by the lift of the skin or other sheet material upon the two particular measuring wheels 37, which carry and actuate the equalizer rod 95.

In the initial position of the reference wheel 98 and the bar 108, the heft indicating or measuring lever mechanism is unaffected on account of the clearance 114 below the follower roller 122. As the skin progresses beneath the measuring wheels 37 and the reference wheel 98, and the bar 108 is moved forward in the direction of the arrow 160, the inclined camming surface 115 gradually raises the follower wheel 122 and the slide 120, thereby actuating the entire heft lever mechanism comprising the levers 126 and 134 as well as the vertical printing rack 152. The position of the high point 113 on the bar 112 is so arranged as to correspond to the desired hefting point of the skin, i. e., so that when the reference wheel 98 has revolved and passed over the skin a predetermined fixed distance and is substantially in alignment with the hefting points of the skin, the vertical slide 120 will be actuated by the highest point 113 on the cam bar 112.

The movement of the lever mechanism 126 and 134 and the printing rack 152, as well as the indicator arm 148, is arrested at the point of greatest displacement, as determined by the high point 113 on the cam bar 112, by means of a friction brake 161. The brake member 161 is pivoted at 162 and is provided with a brake shoe 163, which is adapted to bear frictionally against the vertical surface 164 of the slide 152, due to the weight of the arm 165 of the brake member 161, as shown particularly in Figures 4, 9 and 10.

As the reference bar 108 is moved to the extreme forward position in the direction of the arrow 160, due to the rotation of the reference wheel 98, the high point 113 passes from beneath the follower wheel 122, and the follower wheel 122 is then disposed over the clearance depression 116. Due to the brake 161, however, the slide 120 and follower wheel 122 will not descend into the clearance space 116, but will maintain the set position as determined by the high point 113. If, however, after the reference point 113 has passed the wheel 122, the thickness of the skin or a fold of same increases beyond that registered by the point 113, such additional lift of the equalizer rod 95 will have no effect upon the heft measurement, because the clearance space 116 will not permit of any engagement between the end of the cam bar 112 and the slide 120.

It will thus be seen that by this means the heft measurement is referred directly to two particular parts of the skin, and the measurement obtained from these two particular parts, suitably averaged, is retained upon the indicating and measuring devices, by means of a friction brake.

In order to return the reference wheel 98 as well as the reference bar 108 into the normal or initial position shown in Figure 4, as distinguished from the final position shown in Figure 3, the entire reference mechanism is suitably weighted by means of a counter-weight 166 carried by a chain 167, which passes over a suitable sheave 168 and it is attached to the reference bar 108 at the point 169.

Figure 3:
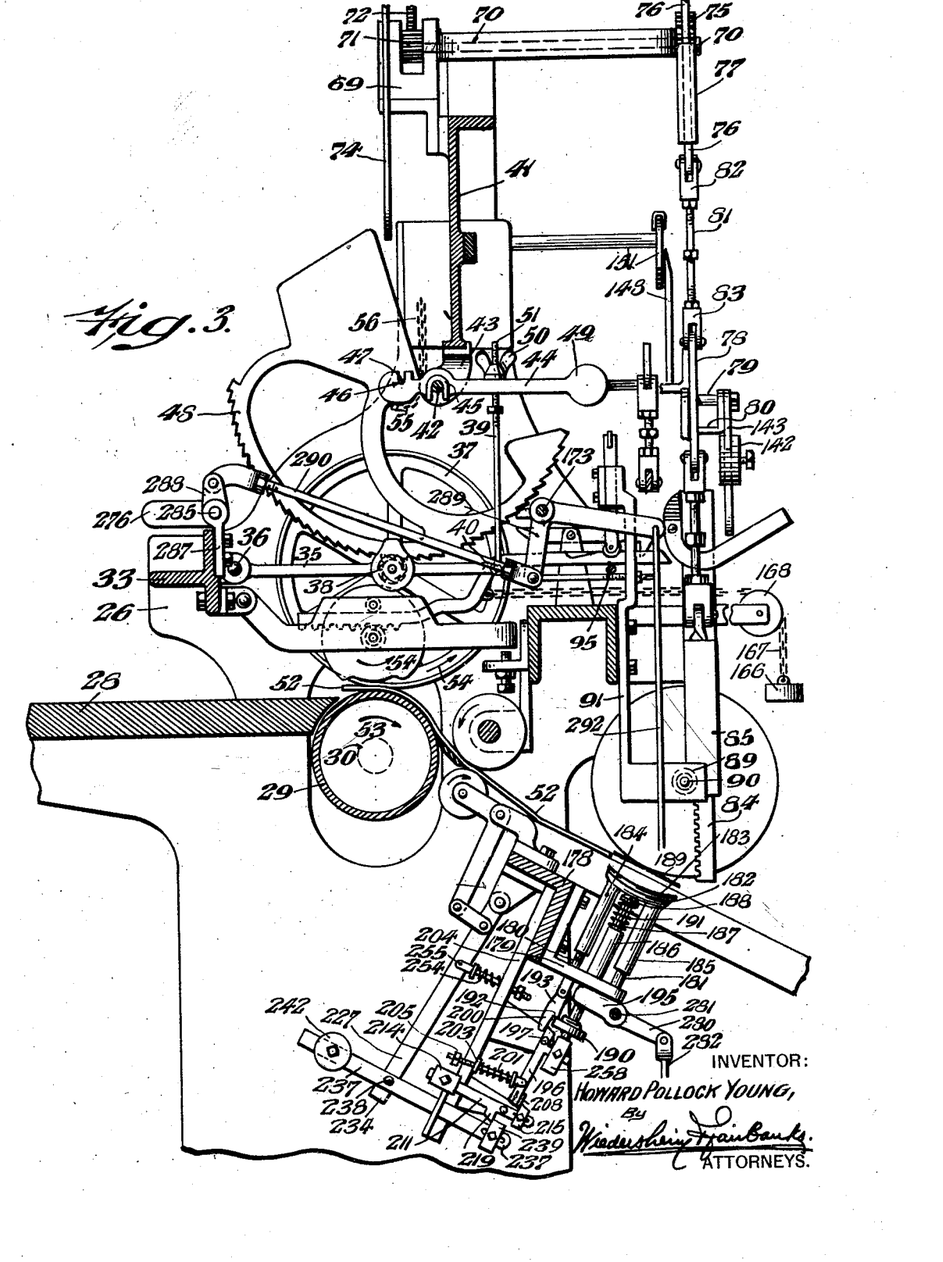
Fig. 3 represents a sectional side elevation on line 3—3 of Figure 1.

It will be observed moreover that as the skin, passing over the bed roll 29, revolves the reference wheel 98 a sufficient peripheral distance to pass the hefting point of the skin and to cause the corresponding high hefting point 113 and the cam portion 112 of the bar 108 to pass beneath the follower wheel 122, the reference wheel 98 is brought to the final position shown in Figure 3, to wit, an inoperative position with respect to the skin 52 and the bed roll 29. Thus as the clearance portion 100 of said reference wheel 98 comes into juxtaposition to the skin 52, the reference wheel 98 stops revolving and the reference bar 108 becomes stationary thereafter, in the extreme forward position shown in Figure 3.

In order to retain the reference mechanism, including the reference wheel 98 and the reference bar 108 in the final or extreme forward position, shown in Figure 3, until the skin has passed entirely through the machine, and until said skin has been properly stamped with the area as well as heft measurements, a suitable pawl 170, pivotally supported at 171 is provided, which is adapted to engage a suitable notch 172 in the auxiliary bar 117, carried by the main reference bar 108, when said auxiliary bar reaches the final or extreme forward position. The pawl 170 is merely actuated by gravity.

After the measurement has been stamped upon the skin 52 by a printing mechanism to be described hereinafter, the machine is reset by a suitable deflection of the release shaft 173, to be described more in detail hereinafter. The release shaft 172 carries a suitable arm 174 in operative alignment with the front end 175 of the pawl 170. Thus as the release shaft 173 is deflected, the arm 174 engages and deflects the front arm 175; and thereby raises the pawl 170 out of engagement with the notch 172. The reference mechanism thus released will then automatically be reset into the extreme rearward position, due to the action of the counter-weight 166 on the end of the chain 167.

In thus resetting the reference mechanism from the extreme forward position shown in Figure 3, to the extreme rearward or initial position shown in Figure 4, the inclined pawl cam 176 of the auxiliary bar 117, engages the gravity friction brake 161, in a manner shown particularly in Figure 4, thereby deflecting the same, and thus withdrawing the brake shoe 163 thereof, from operative engagement with the slide 152. The withdrawing of the friction brake 161 by the action of the auxiliary bar 117, when the latter is reset to its initial position, permits the entire hefting lever mechanism, including the levers 126 and 134, as well as the heft printing wheel 157, also automatically to revert to its initial or zero position, due to the counter-weight 142.

*Print platen actuating mechanism*

The print platen actuating mechanism is supported chiefly upon the transverse, horizontal frame member 178 which carries a right angular bracket 179, directly below and in alignment with the two type or printing wheels 93 and 157. The bracket 179 carries a pair of parallel platen guide rails 180 and 181, upon which the platen 182 is slidably mounted. The platen 182, having a concave, cylindrical, operative surface 183, of a radius substantially equal to the radius of the printing surface of the type wheels 93 and 157, is provided with two downwardly depending hollow tubular supports 184 and 185, corresponding to the rails 180 and 181, which are adapted to fit on to said guide rails snugly and thereby to guide the platen 182 in substantially radial alignment with the printing wheels 93 and 157. The bracket 179 also carries a hollow, tubular guide bearing 186, intermediate the two guide rails 180 and 181, and in substantial radial alignment with the printing wheels, in which a spring plunger hammer or striker 187 is slidably mounted. The upper end of the plunger 187 carries a hammer head 188 which is adapted to abut and engage the platen 182, thereby to raise the same upwardly against the printing ribbon 189 and to force the latter against the skin 52 disposed between the operative surface 183 of said platen and the inking ribbon 189, the latter being immediately adjacent to peripheral type surfaces of the type wheels 93 and 157. To the lower end of the spring plunger 187, a lateral flange 190 is secured. A helical compression spring 191 interposed between head 188 and the upper terminal of the bearing 186 urges the plunger 187 upwardly against the platen 182.

In the "set" or lower position of the flange 190, the latter is engaged and retained by the horizontal shoulder 192 of the pawl 193, pivoted at 194. The pawl 193 is actuated by gravity. Thus, when the spring plunger 187 is retracted into the position shown in Figure 3, and the helical spring 191 is compressed by the downward deflection of the resetting arm 195, said spring plunger will be retained in a position adapted to strike the platen 182 upon being released by the outward deflection of the pawl 193. A lever 196 is pivoted at 197 upon the bracket 198. The upper end 199 of the lever 198 is in operative alignment with the lower terminal 200 of the pawl 193, whereby a deflection of the lever 196 will cause an outward deflection of the pawl 193, so as to release the spring plunger 187.

The rod 201 is pivotally secured to the lower portion of the lever 196 at the point 202, whereas the opposed end of said rod 201 passes through a suitable aperture 203 in the supporting bracket 204 and carries a terminal nut 205 threaded onto the free end thereof. A helical compression spring 206, interposed between the bracket member 204 and a flange 207 carried by the rod 201 tends to force said lever 196 in an outward direction, so that when said lever 196 is not retained against the spring 206 it will be deflected and in turn will deflect the pawl 193 in an outward direction, so as to release the spring actuated platen hammer 187. The lever 196 carries a terminal member 208, adjustably secured thereto by means of the screw 209 passing through an elongated slot 210 in said lever.

A lever 211 is pivoted at 212 upon the bracket 213 and is gravity actuated, due to the counter-weight 214. The lever 211 carries an adjustably mounted catch member 215, secured thereto by means of the screw 216 passing through the elongated slot 217 in said arm 211. The catch member 215 is in operative alignment with the terminal member 208 carried by the lever 196, and is so adjusted upon the lever 211, that when the lever 196 is retracted or reset in the direction of the arrow 218, to the position shown in Figure 3, said catch member 215 will interlock with the terminal member 208 in a manner shown in Figure 3, and will thus retain the lever 196 in said retracted position against the force of the spring 206. The arm 211 also carries a lower releasing projection 219.

The bracket 220 also carried by the transverse frame member 178, carries a right angular print control lever 221, pivoted at 222. The upper and shorter arm 223 carries idle control rolls 224 upon the pivots 225. The lower and longer arm 226 is connected to a lever 227, through a connecting line 228 which is pivoted at 229 to the lowermost end of said arm 226 and pivoted to the lever 227 at a point 230, a short distance from the supporting pivot 231 of said lever 227. By this means, any slight deflection of the upper and shorter arm 223, in either one of two directions 232 or 233 about the pivot 222, will be transmitted through the arm 226 and the link 228, to the lever 227; the free end 234 of which will be displaced an amount several times greater than the displacement of the arm 223, and in either directions 235 or 236, corresponding to the deflection of the arm 223 in directions 233 or 232 respectively.

Figure 6:
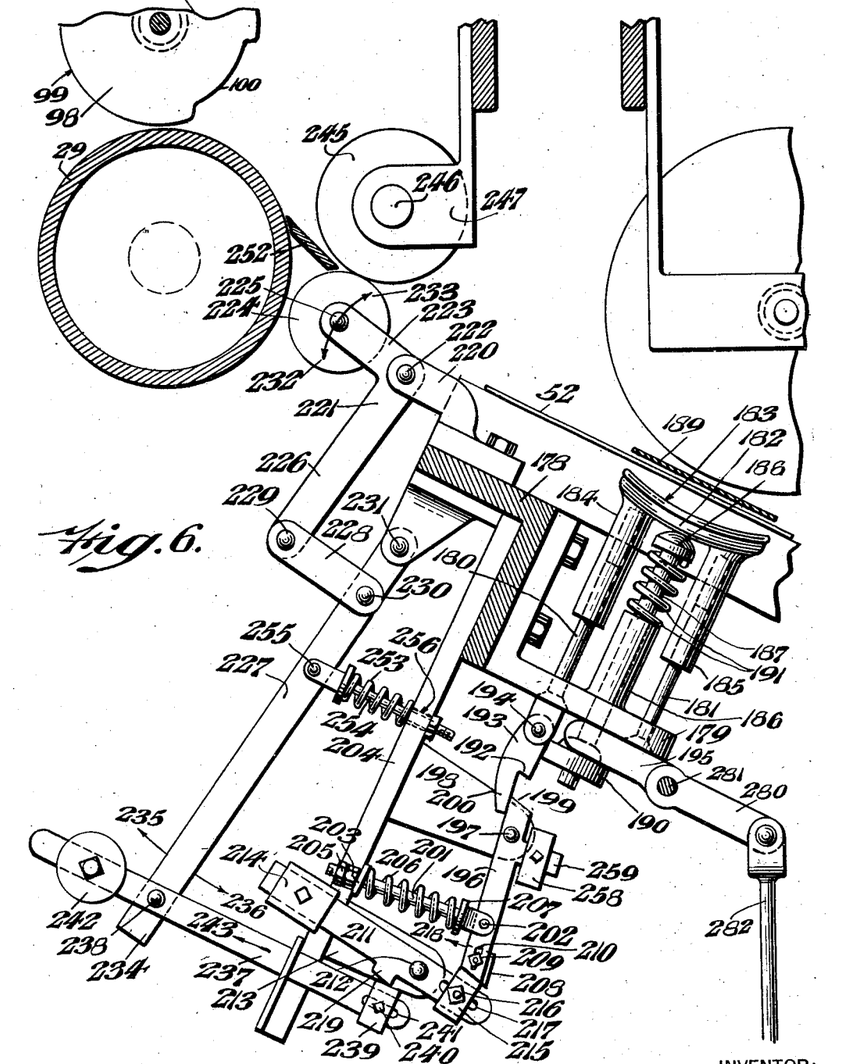
Fig. 6 represents a section on line 6—6 of Figure 2, on a greatly enlarged scale, however, illustrating the sub-assembly of the printing hammer actuating and release mechanism.

A lever 237 is pivoted to the lower end of the lever 227, upon the pivot pin 238. One end of the lever 237 carries a catch 239 adjustably secured thereto by means of the screw 240 passing through the elongated slot 241. The catch 239 is in operative alignment with the release projection 219 on the arm 211, as shown in Figures 3 and 6. In the set position of the print platen actuating mechanism, with the control wheel 224 in its downwardly deflected position, in the direction of the arrow 232, the catch 239 will be in advance of the projection 219 and in operative alignment therewith; being retained in said position by the counter-weight 242 on the opposed end of the lever 237.

As the control wheel 224 is deflected upwardly a slight distance, in the direction of the arrow 233, the corresponding displacement of the arm 223 is transmitted to the free end 234 of the lever 227 in a greatly increased ratio, thereby withdrawing the lever 237 in the direction of the arrow 243. The displacement of the lever 237 in the direction of the arrow 243, with the catch member 239 in interlocking relation to the release projection 219, as shown particularly in Figure 3, causes a deflection of the lever 211 against the action of the counterweight 214 thereon. The deflection of the lever 211 causes a disengagement of the terminal member 218 and the catch member 215, thereby permitting a deflection of the lever 196 by the force of the spring 206. The lever 196 in turn deflects the pawl member 193 outwardly, thereby releasing the flange 190 and allowing the spring plunger or hammer 187 to be forced upwardly by the spring 191, against the platen 182. A sufficient momentum is imparted to the platen 182 by means of the spring hammer 187, so that the platen 182 will continue in an upward direction after the spring hammer 187 has reached the upper limit of its travel, until said platen strikes the lower surface of the skin 52, and thus forces the same against the inking ribbon 189, so as to cause an imprint of the type on the two type wheels 93 and 157, upon the upper surface of the skin. After striking the skin 52, the platen 182 returns to its position of rest by gravity, on to the top of the spring hammer 187 as shown particularly in Figure 6, and thus permits the skin to pass from under the type wheels and inking ribbon.

*Skin feeding mechanism*

Figure 2:
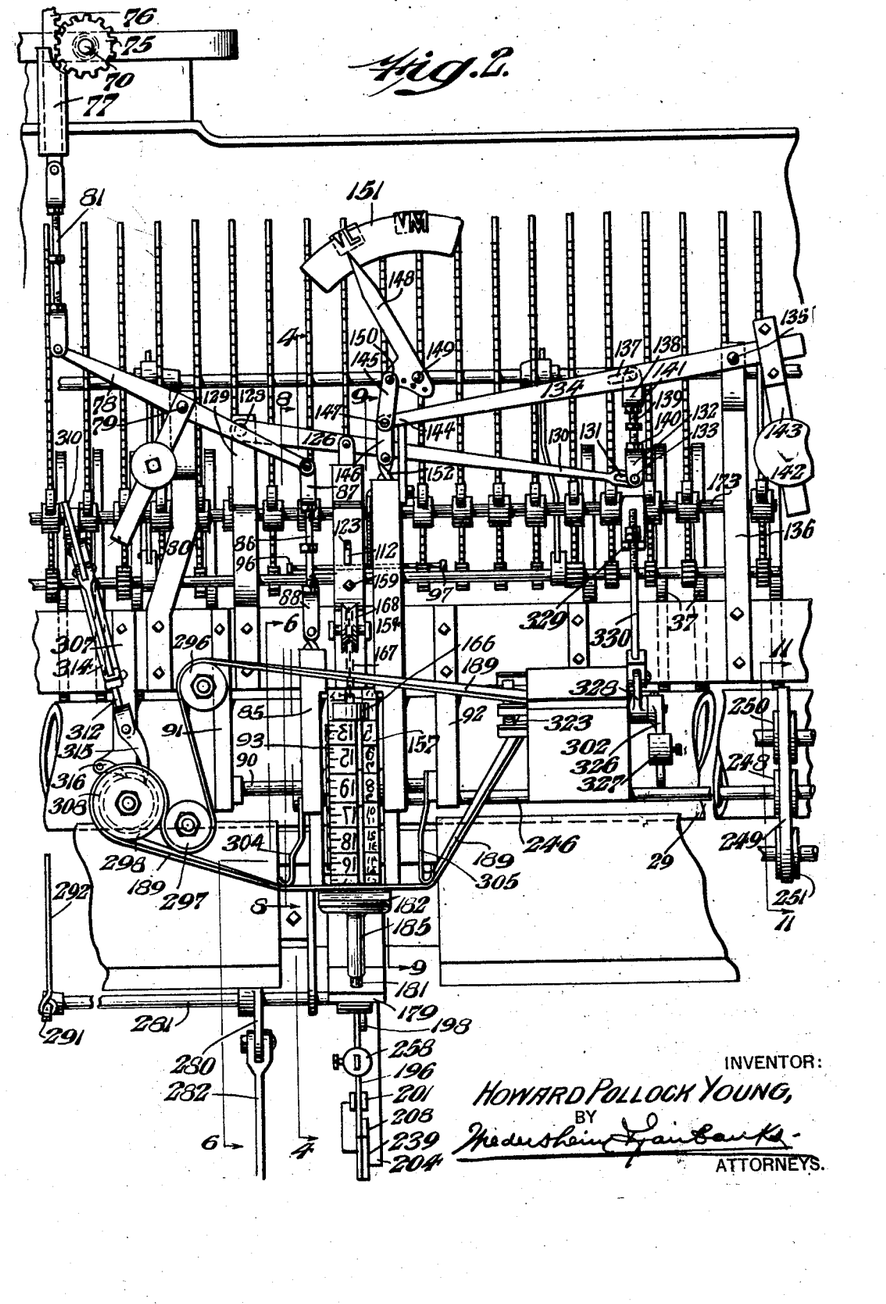
Fig. 2 represents a rear elevation of the same.

In order to feed the skin from the bed roll 29, onto and through the printing mechanism, a feeding roll 245 is provided upon a transverse shaft 246, shown particularly in Figures 6 and 11, which is suitably journalled at one end in the bearing bracket 247. The other end of the shaft 246 carries a pulley 248 (Figures 2 and 11.) A belt 249 passes over the free end portion of the bed roll 29, as well as over a pair of idle pulleys 250 and 251 and over the pulley 248. The diameter the feed roll 245 is made either equal to or slightly greater than the diameter of the pulley 248, so as to impart to the feeding roll 245 a peripheral speed either equal to or slightly greater than the peripheral speed of the bed roll 29.

The skin 52 after passing over the bed roll 29, passes over a guide plate 252, then passes beneath the feed roll 245.

The print control wheel 224 is directly below and in operative alignment with the feed roll 245 and in the normal and inoperative condition of the machine, to wit, when no skin is passing through same, the control wheel 224 is in contact with the feed roll 245 as shown in Figure 6, and is maintained in this position by the force of the spring 253. The spring 253 is carried by a rod 254 which is pivotally secured to the lever 227 at one end, by means of the pivot 255, and the other end of which passes through an aperture 256 in the stationary bracket 204; said spring being operatively interposed and confined between the stationary bracket 204 and said lever 227. The control wheel 224, thus urged upwardly by the spring 253, serves to maintain the skin in contact and in frictional engagement with the feed roll 245, thereby to draw said skin from the bed roll towards the printing mechanism.

The feed roll 245 in turn serves as an upward limit to the movement of control wheel 224 and the arm 223.

Resetting the platen actuating mechanism

In order to reset the platen actuating mechanism, the arm 195 is deflected by a resetting mechanism to be described hereinafter, thereby withdrawing the spring plunger or hammer 187 into the position shown in Figure 3. The lower end of the plunger 187 engages an adjustable abutment 258, carried by the arm 259 on the lever 196. Thus, as the spring plunger or hammer 187 is set into its initial position shown in Figure 3, the lever 196 is also deflected into its normal position against the force of the spring 206. Upon being thus reset into its initial position, the terminal member 208 on the end of the lever 196 is engaged by the catch 215 carried by the gravity actuated lever 211, thus retaining said lever 196 in its initial or "set" position.

As a skin passes over the bed roll 29 and in between the feed roll 245 and the control wheel 224, the latter, as well as the arm 223 are deflected downwardly a distance substantially equal to the thickness of the skin. This slight deflection of the arm 223 causes a substantially greater displacement of the lever 237, thereby causing the catch 239, carried on the end of said lever 237 to pass beneath and in advance of the release projection 219 on the lever 211. With the catch 239 thus positioned in advance of the release projection 219, the platen actuating mechanism is again in position to be released by the slight displacement of the lever 237 in the direction of the arrow 243, which takes place after the skin has passed from between the feed roll 245 and control wheel 224, due to the slight upward movement of the control wheel 224 and the arm 223 at said instant.

Area printing wheel

Figures 12, 13, 15:
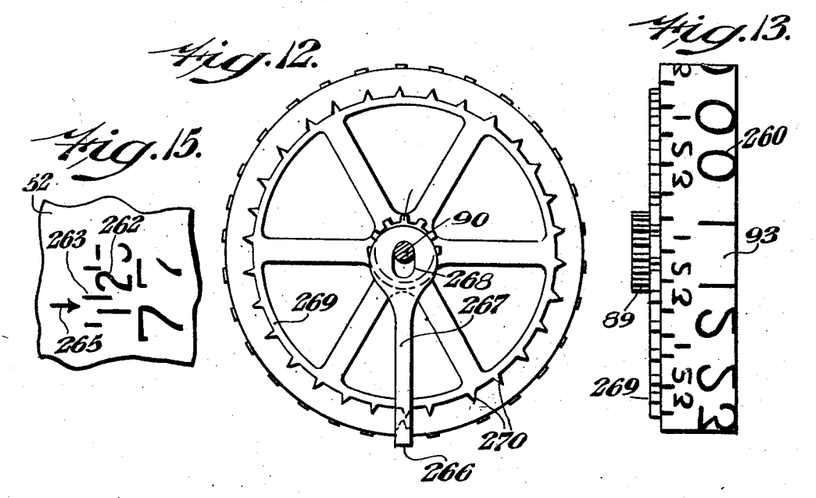
Fig. 12 represents a side elevation of the area printing wheel.
Fig. 13 represents an end elevation of the same, showing the face thereof.
Fig. 15 shows a print from the printing wheel, with the indicia as illustrated in Figure 13.
Figure 14:
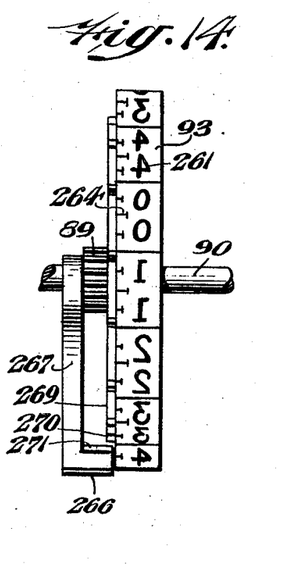
Fig. 14 represents the sub-assembly of the area printing wheel and the guide therefor, and showing an arrangement of numbers or indicia upon the face of the printing wheel somewhat different from that shown in Figure 13.

The area printing wheel 93 may be provided with raised type 260 disposed transversely of the face of the printing wheel, as shown in Figure 13, or raised type 261, disposed longitudinally of the face of the printing wheel, as shown particularly in Figure 14. Thus the area may be stamped upon the skin in a manner shown in Figure 15, which represents a fragmentary portion of a skin with the area stamped thereon by the type 260, shown in Figure 13. The large numerals indicate square feet of area, while the smaller numerals 262 placed above, and between the division lines 263, represent fractions of a square foot, preferably expressed in quarters. In the type shown in Figure 14, the area is similarly expressed in square feet, by the numeral type 261, while the fractions of a square foot are merely indicated by the division lines 264.

Immediately adjacent to the printing wheels, and also in alignment with the platen 182, a stationary type of an arrow may be provided, which will print the arrow 265 (Figure 15) on the skin immediately adjacent the division marks 263 or 264, as the case may be, thereby to indicate the fraction of a square foot of area measurement to be read. The arrow 265 may be adjusted to the zero position of the printing wheel.

In Figures 12, 13 and 14 a zero marking arrow is shown, which instead of being fixed, is loosely suspended from the shaft 90 as shown particularly in Figures 12 and 14. The zero marking arrow 266 is thus provided on the lower end of a vertical marker 267, having an elongated opening 268 at its upper end, through which the shaft 90 passes.

A toothed wheel 269 is secured to the type wheel 93, having suitable teeth 270 in spaced relation to the divison marks 263 or 264. The zero arrow marker 267 in turn carries an upper sharp edge 271 which is in operative alignment with the teeth 270 of the toothed wheel 269. If it is desired to print the arrow 272 in line with one of the division marks 264, the teeth 270 may be so arranged as to guide the marker 267 onto the nearest division line 264. It is preferable, however, to guide the arrow marker 267 to a point between two of the division marks 264. The teeth 270 are therefore positioned directly in alignment with the division marks 264 so that in the event a division line 264 is in direct vertical alignment with the arrow marker 267, said arrow marker 267 will be placed on either side of the division, due to the engagement of the teeth 270 with the upper edge 271 of said marker.

Figure 16:
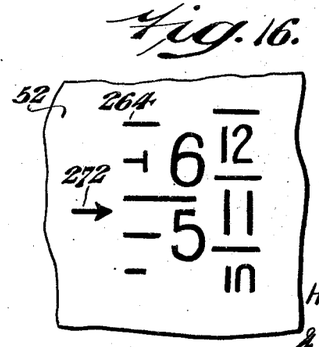
Fig. 16 represents a print from the area printing wheel, with the indicia as illustrated in Figure 14.
Figure 17:
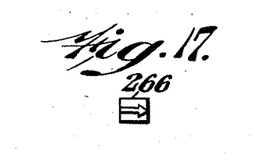
Fig. 17 is the end view of the guide shown in Figure 14, illustrating the arrow printing type thereof.
Figure 18:
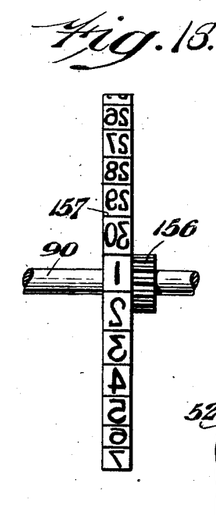
Fig. 18 represents an end elevation of the thickness printing wheel.

A fragmentary portion of a skin is shown in Figure 15, with the area measurement stamped thereon from the printing wheel shown in Figure 13. In this print, moreover, a stationary arrow marker has been employed. A fragmentary portion of a skin is shown in Figure 16, having both the area as well as the heft measurements stamped thereon. The area measurement on the left is that stamped by the printing wheel 93 shown in Figure 14, while the heft measurement on the right is that stamped by the heft printing wheel 157 shown in Figure 18.

Resetting mechanism

Figure 1:
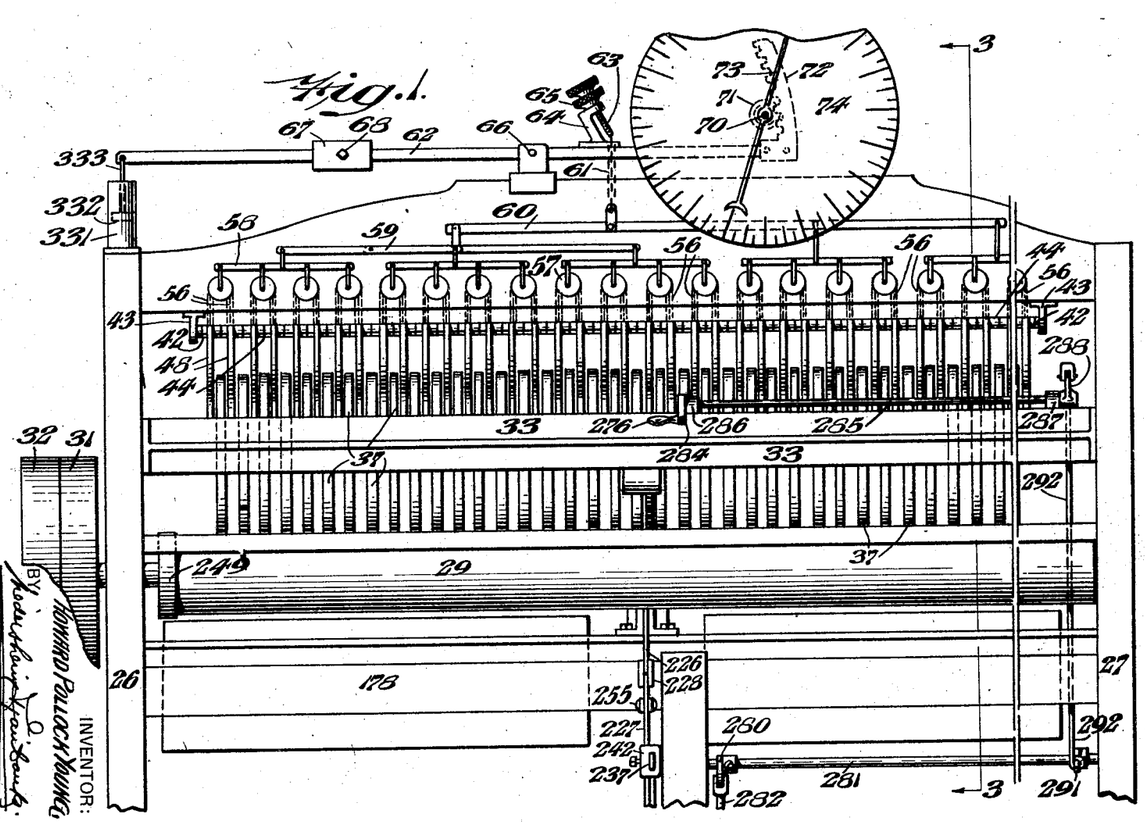
Fig. 1 represents a front elevation of a novel measuring machine embodying my invention.

The resetting mechanism is shown in outline in Figure 7 as well as in Figure 1, and it includes a lower foot pedal 275 as well as an upper and manually operable handle 276, which are suitably inter-connected, so that the machine may be reset either by foot or by hand, as may be desirable. The foot pedal 275 is carried by a lever 277 pivoted at 278 upon a transverse frame member 279. The rear end of the lever 277 is connected to a substantially horizontal arm 280, carried by the lower transverse platen resetting shaft 281, through a vertical connecting rod 282. The shaft 281 carries the resetting arm 195 described hereinabove, and is suitably journalled in the bracket 283.

The handle 276 in turn is carried by an arm 284, upon a shaft 285 on the front of the machine, said shaft 285 being journalled in the two bearing brackets 286 and 287. The outer end of the shaft 285 carries an arm 288 which is connected to a right angular rocker arm 289 on the main resetting shaft 173, through a connecting rod 290, as shown in Figure 7. The opposed end of the rocker arm 289 is in turn connected to an arm 291 upon the lower resetting shaft 281, by means of a vertical connecting rod 292. By this means the handle 276 and the foot pedal 275 are inter-connected.

The upper and main resetting shaft 173 extends transversely across the entire width of the machine and carries a series of loosely mounted pawls 293 corresponding to and in operative alignment with each of the area measuring sectors 48. Each pawl 293 carries a counterweight 294 which causes said pawl normally to engage the teeth of the sector 48, thereby to retain the same in its displaced position.

Suitable pins (not shown in the drawing) are provided along the shaft 173, which are adapted to engage the pawl 293, when the shaft 173 is deflected in the direction of the arrow 295 thereby to deflect said pawls into a non-interengaging position after the measurement of a skin has been completed, so as to release the sectors 48 and to permit the same to gravitate into their initial position for the next succeeding operation.

The inking ribbon feed mechanism

The inking ribbon 189 is in the form of an endless band of suitable textile material and of suitable width, and is supported at one end by a pair of idle rolls 296 and 297 and a driving roll 298. At the other end, and on the other side of the printing wheels, the endless inking band 189 is carried by a series of idle rolls 299, 300 and 301, disposed within a bath housing 302, within which many suitable pigment bath 303 may be contained, and into which the said inking ribbon is immersed. The two stationary guides 304 and 305 on either side of the printing wheels 93 and 157, serve to guide the ribbon 189 beneath said printing wheels and in alignment with the platen 182.

The inking ribbon drive roll 298 is loosely mounted upon a stationary pivot 306 carried by a bracket 307, and said driving roll carries an actuating ratchet wheel 308. A bracket 309 carries a pivotally mounted actuating lever 310, one end of which extends over the main resetting shaft 173 and is in operative alignment with a cam arm 311 affixed to said shaft 173. To the opposed end of the lever 310 a connecting rod 312 pivotally secured at 313; the lower end of said rod 312 being slidably mounted in a guide bracket 314. The lower end of the rod 312 carries a pawl member 315 pivotally secured thereto, which is in alignment with the ratchet wheel 308 and is adapted to actuate the same each time the resetting shaft 173 is deflected in the direction of the arrow 295, thereby intermittently to move the inking ribbon 189 a slight distance with each resetting of the machine. An auxiliary pawl 316 also pivotally mounted upon the bracket 307, serves to prevent any back-lash of the ratchet wheel 308 and driving roll 298, as well as of the entire endless printing band 189.

Figures 19, 22:
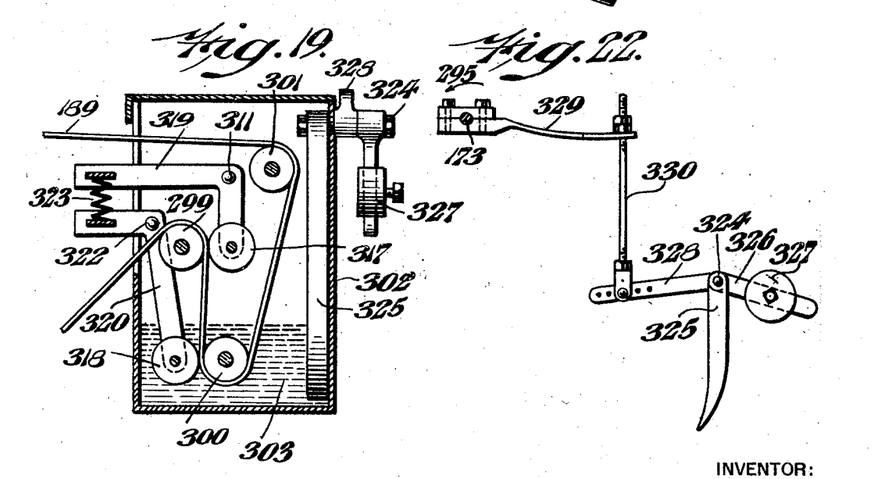
Fig. 19 represents a front elevation of the inking bath container and mechanism, with the housing shown in section.
Fig. 22 represents a side elevation of the pigment stirring device within the inking bath container or housing, shown in Figure 19.
Figure 20:
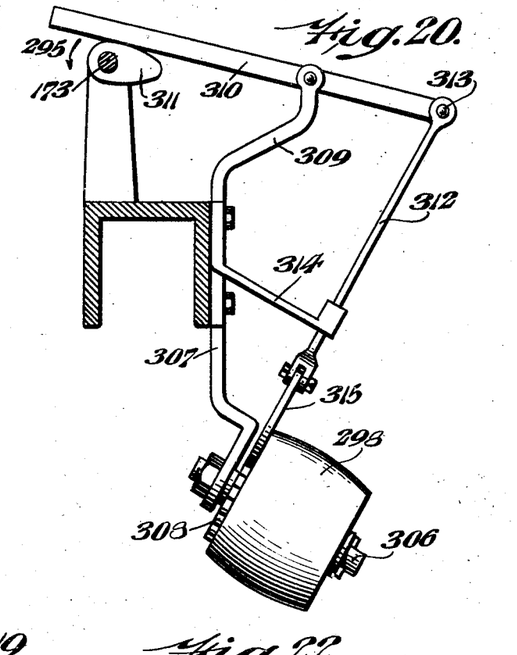
Fig. 20 represents a side elevation of the inking ribbon driving roll and the sub-assembly of the actuating mechanism therefor.
Figure 21:
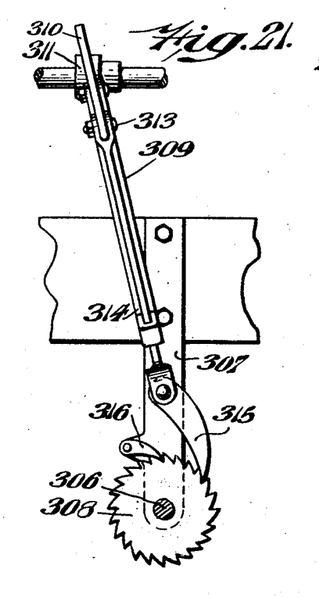
Fig. 21 represents an end elevation of the driving roll and actuating mechanism shown in Figure 20.

In order to remove from the band 189 all excess inking material or pigment, after it leaves the bath 303, a pair of squeezing rolls 317 and 318 are provided, in juxtaposition to the idle rolls 299 and 300 respectively. The idle squeezing rolls 317 and 318 are carried by suitable angular levers 319 and 320, pivotally mounted at 321 and 322 respectively between the free ends of which a helical compression spring 323 is interposed, tending to press the corresponding squeezing rolls 317 and 318 against the opposed surfaces of the inking band 189, as it passes over the idle rolls 299 and 300 respectively, as is shown more particularly in Figure 19.

As in marking skins, it is desirable to use some finely divided and insoluble solid pigment suspended in water, instead of a pigment in actual solution it is necessary to agitate the bath 303 in the housing 302, in order to maintain the pigment in proper suspension in the bath of water.

An agitator shaft 324 is provided, extends through the side wall of the housing 302, at a suitable point. To the inner end of the shaft 324 a downwardly depending agitator arm 325 is secured, while to the outer end of said shaft 324 a counterweight arm 326 carrying the counter-weight 327, as well as an actuating arm 328 is secured. An arm 329 is secured to the main resetting shaft 173 and a connecting rod 330 is interposed between the free end of the arm 329 and the arm 328. By this means the agitator arm 325 will be actuated with each deflection of the shaft 173 at the end of each operation, when the entire machine is reset.

In order to check or retard the resetting of the area measuring mechanism, a dashpot 331 is provided upon the frame of the machine, in which a piston 332 is mounted. A connecting rod 330 is interposed between the piston and the end of the balance beam 62. The dash-pot and the piston are so arranged as to permit the gradual displacement of the balance beam so as to prevent any sudden displacement as when the machine is released after each complete measurement.

Having thus described my invention what I claim as new and desire to secure by Letters Patent, is:—

1. In a measuring machine of the character stated, a series of measuring wheels for registering the linear measurements of a sheet, means for measuring the thickness of said sheet while the same is moving through said machine, means for referring said measurement to a predetermined part of said sheet with respect to the entering edge thereof, and means for stamping said thickness measurement upon the sheet after said predetermined part of said sheet has passed beyond the measuring means.

2. In a measuring machine of the character stated, means for measuring the thickness of a sheet while the same is moving through said machine, means for referring said measurement to a predetermined part of said sheet with respect to the entering edge thereof, means for stamping said thickness measurement upon the sheet after the latter has passed completely beyond the measuring means, and a series of measuring wheels for registering the linear measurements of said sheet.

3. In a measuring machine of the character stated, a series of measuring wheels for registering linear measurements of a sheet, means to integrate the measurement of each of said wheels, a hefting device to indicate the thickness of said sheet, and means to refer the heft measurement to a predetermined part of the sheet with respect to the entering edge thereof.

4. In a measuring machine of the character stated, a series of measuring wheels for registering linear measurements of a sheet, means to integrate measurement of each of said wheels, a selective type device having type representative of area measurements, means intermediate said selective type device and said area integrating means, for setting the former to correspond with the integrated area measurement, a printing platen in juxtaposition to said selective type device, means for actuating said platen in timed relation the movement of the sheet through the machine, a hefting device for measuring the thickness of said sheet, and means for referring the thickness measurements thus obtained to predetermined parts of said sheet with respect to the entering edge thereof.

5. In a measuring machine of the character stated, a series of area measuring wheels, adapted to travel over the surface of a sheet to be measured and to register parallel linear distances between the borders of said sheet, means to integrate said linear measurements, means to register an area measurement thus integrated, a selective printing mechanism controlled by said area registering means for printing upon said sheet the integrated area measurement, heft registering means controlled by the thickness of said sheet, means for referring the thickness measurements to predetermined parts of said sheet with respect to the entering edge thereof, a selective printing device controlled by said heft registering means for printing said thickness measurement upon said sheet.

6. In a measuring machine of the character stated, a series of area measuring wheels, adapted to travel over the surface of a sheet to be measured and to register paralled linear distances between the borders of said sheet, means to integrate said linear measurements and means to register area measurement thus integrated, a selective printing mechanism controlled by said area registering means for printing upon said sheet the integrated area measurement, heft registering means controlled by the thickness of the sheet, a selective heft printing device controlled by said heft registering means for printing upon the sheet the thickness measurement thereof, and means to refer the heft measurement to a predetermined part of the sheet with respect to the entering edge thereof.

7. In a measuring machine of the character stated, a thickness measuring device adapted to travel over the surface of a sheet the thickness of which is to be measured, said thickness measuring device being adapted to be displaced from its normal position by the thickness of the sheet, means to register the thickness measurement, means intermediate said registering means and said thickness measuring device for operatively interconnecting one with the other in timed relation to the relative movement of the thickness measuring device over said sheet, means of printing said thickness measurements on the corresponding parts of said sheet with reference to the entering edge thereof, and means for registering the linear measurement of said sheet.

8. In a measuring machine of the character stated, a revoluble bed roll having a fixed axis, a hefting device in spaced relation to the surface of the bed roll and movable with respect to the axis thereof and being adapted to be displaced by a sheet disposed upon the surface of the bed roll, thickness registering means, and means intermediate said thickness registering means and said hefting device for temporarily operatively interconnecting one with the other in spaced relation with reference to the entering edge of the sheet.

9. In a sheet measuring machine of the character stated, means for registering the thickness of the sheet, means for registering the area of the sheet, means for automatically recording said thickness and area measurements, and means controlled by the thickness of the sheet for actuating said recording means.

10. In a sheet measuring machine of the character stated, means for registering the thickness of a sheet, means for registering the area of the sheet, means for automatically recording upon the sheet both said thickness and area measurements and means controlled by the thickness of the sheet for actuating said recording means.

11. In a sheet measuring machine of the character stated, a series of spaced measuring means for measuring linear distances between the opposed edges of the sheet along parallel and spaced lines, means to integrate the series of linear measurements into an area measurement of the sheet, means to register the integrated area measurement, means to reset the measurement and registering means, and means to retard the resetting of the area registering means.

HOWARD POLLOCK YOUNG.